(12) United States Patent
Tacke et al.

(10) Patent No.: US 9,079,653 B2
(45) Date of Patent: Jul. 14, 2015

(54) FIBER COMPOSITE COMPONENT FOR ABSORBING ENERGY

(75) Inventors: Stefan Tacke, Buxtehude (DE); Thorsten Roming, Himmelpforten (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 13/072,229

(22) Filed: Mar. 25, 2011

(65) Prior Publication Data
US 2011/0236622 A1 Sep. 29, 2011

Related U.S. Application Data

(63) Continuation of application No. PCT/EP2009/061264, filed on Sep. 1, 2009.

(60) Provisional application No. 61/100,935, filed on Sep. 29, 2008.

(30) Foreign Application Priority Data

Sep. 29, 2008 (DE) .......................... 10 2008 042 452

(51) Int. Cl.
*B32B 3/24* (2006.01)
*B64C 1/06* (2006.01)
*B32B 1/00* (2006.01)
(Continued)

(52) U.S. Cl.
CPC . *B64C 1/062* (2013.01); *B32B 1/00* (2013.01); *B32B 3/266* (2013.01); *B32B 15/08* (2013.01); *B32B 2262/106* (2013.01); *B32B 2307/558* (2013.01); *B32B 2307/56* (2013.01); *B32B 2307/714* (2013.01); *B32B 2605/18* (2013.01); *B64C 2001/0072* (2013.01);
(Continued)

(58) Field of Classification Search
CPC ................................. B32B 3/266; B64C 1/068
USPC .................................. 428/140, 138; 244/119
See application file for complete search history.

(56) References Cited

U.S. PATENT DOCUMENTS 6,114,050 A    9/2000   Westre et al.
6,613,258 B1 *   9/2003   Maison et al. ................ 264/102
(Continued)

FOREIGN PATENT DOCUMENTS

CN          1270551      10/2000
DE        697 34 616 T2    6/2006
(Continued)

OTHER PUBLICATIONS

International Search Report for PCT International Application No. PCT/EP2009/061264 dated Nov. 3, 2009.
(Continued)

*Primary Examiner* — William P Watkins, III
(74) *Attorney, Agent, or Firm* — Jenkins, Wilson, Taylor & Hunt, P.A.

(57) ABSTRACT

In the case of a fiber composite component for energy absorption in the event of a crash for an aircraft or spacecraft, the fiber composite component is formed as a laminate construction made of CFRP layers and at least one integrated metal foil portion which is corrosion-resistant with respect to the CFRP layers. A fuselage structure portion of an aircraft or spacecraft is formed using at least one fiber composite component of this type. An aircraft or spacecraft comprises a fuselage structure portion of this type.

9 Claims, 3 Drawing Sheets

(51) Int. Cl.
  *B32B 3/26* (2006.01)
  *B32B 15/08* (2006.01)
  *B64C 1/00* (2006.01)

(52) U.S. Cl.
  CPC ....... *Y02T 50/433* (2013.01); *Y10T 428/24132* (2015.01); *Y10T 428/24331* (2015.01)

(56) References Cited

U.S. PATENT DOCUMENTS

| | | | |
|---|---|---|---|
| 7,595,112 B1 * | 9/2009 | Cano et al. | 428/408 |
| 7,803,453 B2 | 9/2010 | Steinke et al. | |
| 2008/0029186 A1 | 2/2008 | Abkowitz | |
| 2008/0075601 A1 * | 3/2008 | Giusti et al. | 416/229 A |

FOREIGN PATENT DOCUMENTS

| | | |
|---|---|---|
| DE | 10 2006 023 210 A1 | 11/2007 |
| EP | 1 801 427 A1 | 6/2007 |
| FR | 2766407 | 1/1999 |
| GB | 1 364 076 A | 8/1974 |
| GB | 2 041 824 A | 9/1980 |
| WO | WO 00/56 541 A1 | 9/2000 |
| WO | WO 2005/030577 | 4/2005 |
| WO | WO 2006005550 A1 * | 1/2006 |
| WO | WO 2007/093503 | 8/2007 |
| WO | WO 2007/094686 A1 | 8/2007 |
| WO | WO 2008/105897 A2 | 9/2008 |
| WO | WO 2009/014486 A1 | 1/2009 |

OTHER PUBLICATIONS

German Office Action for German Application No. 10 2008 042 452.8-16 dated Feb. 23, 2009.

Chinese Office Action for Application No. 200980137223.X dated Nov. 26, 2013.

Chinese Office Action for Application No. 200980137223.X dated Mar. 27, 2013.

* cited by examiner

FIBER COMPOSITE COMPONENT FOR ABSORBING ENERGY

CROSS-REFERENCE TO RELATED APPLICATIONS

This application is a continuation of PCT/EP2009/061264 filed Sep. 1, 2009 and claims the benefit of and priority to U.S. Provisional Application No. 61/100,935, filed Sep. 29, 2008 and German Patent Application No. 10 2008 042 452.8, filed Sep. 29, 2008, the entire disclosures of which are herein incorporated by reference.

FIELD OF THE INVENTION

The present invention relates to a fiber composite component of an aircraft or spacecraft, a fuselage structure portion and an aircraft or spacecraft.

Although the present invention and the problem on which it is based can be applied to any fiber composite components, in the following they will be described in detail with reference to fiber composite components, in particular carbon fiber reinforced plastics material (CFRP) components, for example formers and support members of a fuselage structure of an aircraft.

Fuselage structures in aircraft construction currently consist of reinforced skin fields (for example, reinforced using stringers), formers, crossbars for the floor of the passenger cabin as well as crossbars or a lattice for the floor of the hold. The individual components are generally produced from metal and are connected using rivets and bolts. In the case of a vertical impact or crash of a portion of the fuselage structure, or "fuselage barrel", on the ground, a large part of the impact energy is absorbed by the resilient-plastic behaviour of the metal components, ensuring the safety of the passengers.

The use of fiber composite components is widespread in aircraft construction, for example for skin fields and the reinforcement thereof using stringers. They are produced, for example, by vacuum infusion processes for introducing a matrix, for example an epoxy resin, into fiber semi-finished products and by subsequent curing. Infusion processes can be economical in comparison with other known processes for producing fiber composite components, such as the prepreg process, because more economical fiber semi-finished products can be used.

In future aircraft, new, lighter materials, in particular CFRP, are becoming increasingly important for use in the supporting fuselage structure. Thus, the use of fiber composite materials is provided for all essential components therein: skins and stringer, formers and crossbars. Although the fiber composite material has a high strength, it can suddenly fail as a result of the action of forces during an impact. In the event of a crash, this brittle behaviour has the result that large regions of the fuselage structure fail without absorbing impact energy to a sufficient extent.

SUMMARY OF THE INVENTION

Therefore, the object of the present invention is to provide a fiber composite component for absorbing energy in the event of a crash for an aircraft or spacecraft, a corresponding fuselage structure portion and an aircraft or spacecraft which no longer have, or significantly reduce the above-described drawbacks and provide further advantages.

According to the invention, this object is achieved by a fiber composite component, a fuselage structure portion and an aircraft or spacecraft.

Accordingly, a fiber composite component for absorbing energy in the event of a crash for an aircraft or spacecraft is provided. The fiber composite component is formed as a laminate construction made of CFRP layers and at least one integrated metal foil layer which is corrosion resistant with respect to the CFRP layers.

A fuselage structure portion of an aircraft or spacecraft is also provided. The fuselage structure portion comprises at least one above-described fiber composite component as a crash or impact region.

Advantageous embodiments and improvements of the present invention are provided in the dependent claims.

An underlying idea of the invention is to integrate at least one metal foil layer, which is corrosion-resistant with respect to CFRP layers, into CFRP layers of the fiber composite component.

In comparison with the approaches mentioned at the outset, the present invention therefore has inter alia the advantage that the use of a laminate made of a metal layer and CFRP layers combines the advantages of the two materials, namely the ductility of the metal and the high strength and low weight of the CFRP layers.

The at least one metal foil layer which is corrosion-resistant with respect to CFRP layers is arranged between at least two CFRP layers and connected thereto. This has the result that the at least two CFRP layers are intimately connected to the metal foil layer which they enclose. In the event of failure, although the fiber composite material exhibits brittle behaviour, the combination with the relatively highly resilient and ductile metal plates or layers embedded in a laminate of this type results in certain resilient-plastic behaviour.

In a preferred arrangement, the at least one metal foil layer which is corrosion-resistant with respect to the CFRP layers extends in the longitudinal direction of the fiber composite component. As a result, forces which can occur during an impact are absorbed in that the ductile metal layer is deformed and owing to its high resilience inhibits a sudden rupturing or breaking of the fiber composite layers.

In one embodiment, the at least one metal foil layer which is corrosion-resistant with respect to the CFRP layers can be a sheet metal plate having a thickness of 0.2 mm to 0.3 mm, preferably 0.15 mm to 0.2 mm. The metal foil layer which is corrosion-resistant with respect to the CFRP layers comprises a metal having a high ductility, preferably at least 20%.

A metal of this type can, for example, be a suitable stainless steel. In a further embodiment, a high-purity titanium material, for example pure grade 2 titanium which is suitable for aircraft, is preferred for this purpose.

In a further embodiment, the at least one metal foil layer which is corrosion-resistant with respect to the CFRP layers can have a preformed shape. This makes it possible for example also to produce accordingly fiber composite components having complex shapes. The preformed shape can, for example, be preformed in a Z-shape for a Z-former.

To provide targeted failure behaviour of the fiber composite component, the at least one metal foil layer which is corrosion-resistant with respect to the CFRP layers can, for example, be formed with a perforation or punching or the like, arranged at suitable predetermined points in the shape of the fiber composite component. Instead of a perforation or punching, preformed kink points/lines, for example, can also be introduced into the metal foil layer.

In a further embodiment, the at least two CFRP layers comprise a curable synthetic resin, for example epoxy resin, polyester resin, BMI resin or the like, it advantageously being possible to make use of experience with these conventional production methods. It is also possible for further composite layers to consist of a combination of CFRP and other materials, for example glass fibers, or to consist only of these other materials, also with a different matrix.

A fiber composite component according to the invention can preferably be formed as a former or former portion, a connector or connection member or a support member. Components of this type absorb high forces in the event of a crash and are then capable of providing a considerable amount of absorption through deformation work.

The above-described fiber composite component can be integrated into a fuselage structure portion. However, a fuselage structure portion of this type can also consist of a large number of like and/or different fiber composite components of the above-described type, whereby a "crash zone" can be constructed in a targeted manner.

An aircraft or spacecraft can comprise a fuselage structure portion of the above-described type.

BRIEF DESCRIPTION OF THE DRAWINGS

In the following, the invention is described in detail on the basis of embodiments with reference to the accompanying figures of the drawings, in which.

DESCRIPTION OF EXEMPLARY EMBODIMENTS

Figure 1:
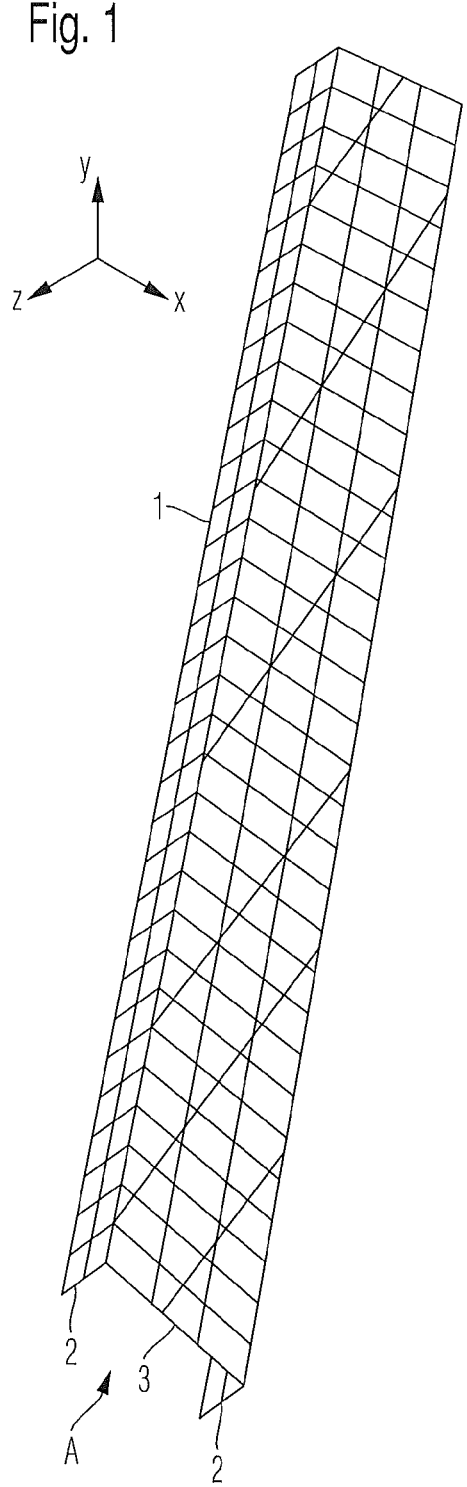
FIG. 1 is a perspective view of a first embodiment of a fiber composite component according to the invention.

In the figures, like reference numerals denote like or functionally equivalent components, unless indicated otherwise. Coordinate systems x, y, z and x1, y1, z1 are also given in the figures to facilitate orientation.

Figure 2:
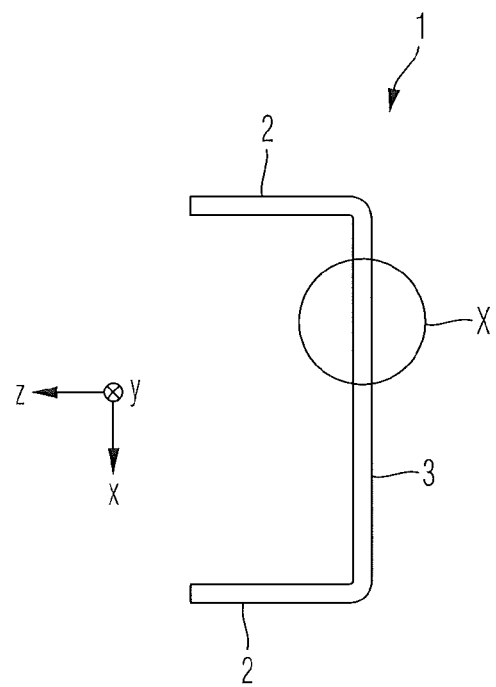
FIG. 2 is a schematic view A of the first embodiment according to FIG. 1.

FIG. 1 is a perspective view of a first embodiment of a fiber composite component 1 according to the invention. This fiber composite component 1 has a U-shaped profile, as shown in FIG. 2 in a schematic view A of the first embodiment according to FIG. 1. A side portion 2 is applied substantially at right angles to a web 3 extending in the longitudinal direction (y-direction) of the fiber composite component 1 in each case. The side portions 2 extend in the longitudinal direction y and in a z-direction of the fiber composite component 1. A width in the x-direction of the web 3 decreases in the longitudinal direction of the fiber composite component 1, from the bottom to the top of FIG. 1.

The web 3 of the fiber composite component 1 comprises at least one metal layer extending in the longitudinal direction y, as indicated by rough hatching in this case. A construction and use of the fiber composite component 1 is described in further detail below.

Figure 3:
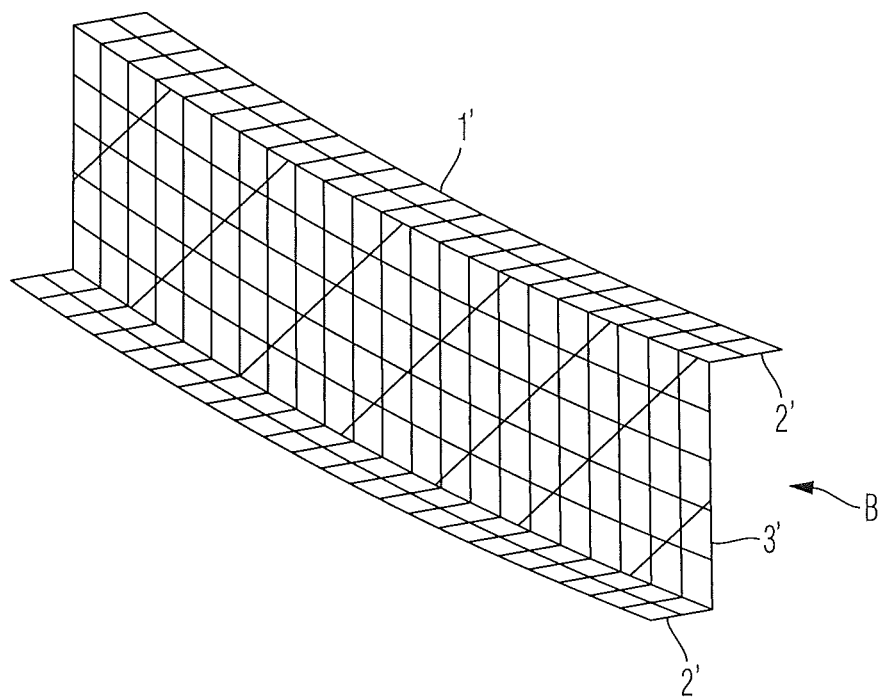
FIG. 3 is a perspective view of a second embodiment of a fiber composite component according to the invention.
Figure 4:
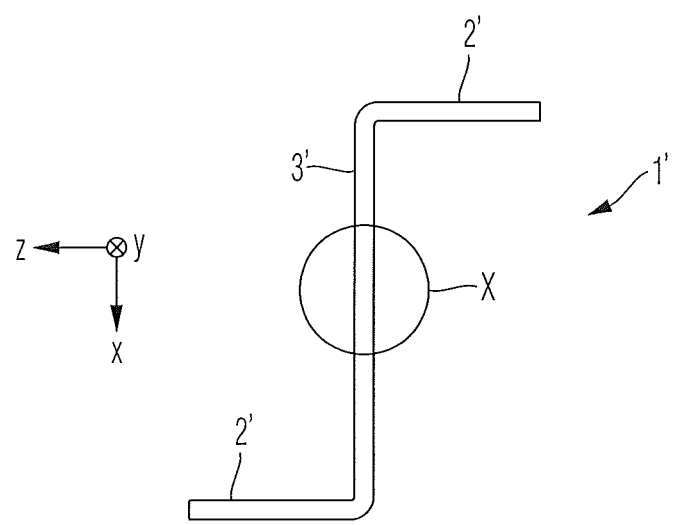
FIG. 4 is a schematic view B of the second embodiment according to FIG. 3.

FIG. 3 is a perspective view of a second embodiment of a fiber composite component 1' according to the invention. Similarly to FIG. 2, FIG. 4 is a schematic view B of the cross-section of the fiber composite component 1'. This part 1' is a former portion, one web 3' of which extends in an xy-plane and is curved in its longitudinal direction. In this case, an upper edge of the web 3' is provided with a side portion 2', the width of which extends in the negative z-direction substantially at right angles to the web 3'. A side portion 2' is integrally formed on a lower edge of the web 2', the width of which side portion extends in the z-direction, likewise substantially at right angles to the web 3'. In FIG. 3 the view of the cross-section in direction B illustrated in FIG. 4 shows a Z-shaped profiled part of this fiber composite component 1', the web 3' of which is, as in the first embodiment according to FIG. 1, provided with at least one metal layer. This metal layer also extends in the longitudinal direction of the web 3' and is indicated by rough hatching.

The construction of the fiber composite components 1 and 1' will now be explained in further detail with reference to FIG. 5, which is an enlarged view of the regions X of FIGS. 2 and 3.

In a CFRP composite 8, a large number of layers 4, 5, 6, 7 are arranged in a particular order one after the other in the z-direction. The longitudinal directions thereof extend in the y-direction of the respective fiber composite component 1, 1'. In the example shown, two metal foil layers 6 are integrated between fiber composite layers, in this case CFRP layers 4, 5, 7. The two metal foil layers 6 are corrosion-resistant with respect to the CFRP layers 4, 5, 7. Fibers of these CFRP layers 4, 5, 7 extends substantially in the y-direction. Each metal foil layer 6 is initially outwardly covered by a CFRP cover layer 5, to which a CFRP outer layer 4, the free surface of which forms an outer surface of the CFRP composite 8, is then attached. Towards the centre of this CFRP composite 8, each metal foil layer 6 is covered with a CFRP inner layer 7, two CFRP inner layers 6 resting against one another in this case. Naturally, many other combinations and numbers of layers are possible.

Figure 5:
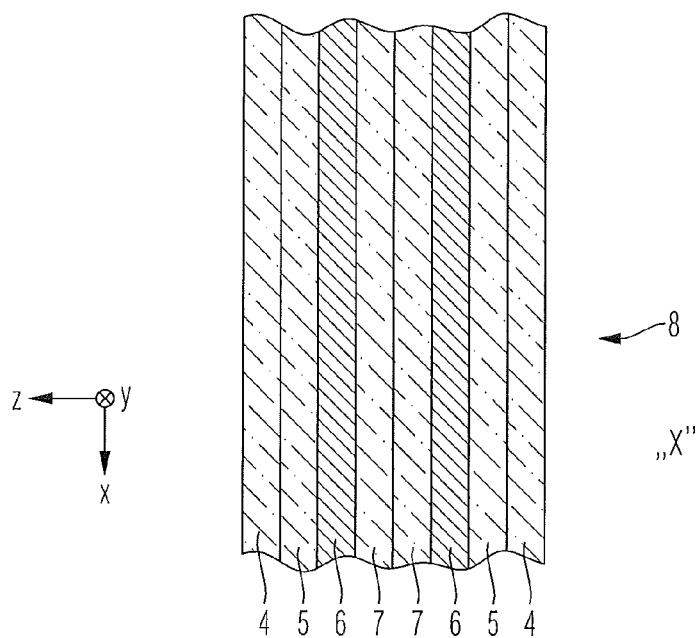
FIG. 5 is a schematic enlarged view of the regions X according to FIGS. 2 and 4.

In this example, a hybrid laminate construction of the type shown in FIG. 5 preferably comprises metal foil layers 6 which are corrosion-resistant with respect to the CFRP layers 4, 5, 7, are made of high-purity grade 2 titanium for the aircraft, and are highly resilient. In this example, the metal foil layers 6 which are corrosion-resistant with respect to the CFRP layers 4, 5, 7 are thin titanium sheets having a thickness in the z-direction of approx. 0.2 mm to 0.3 mm, preferably 0.15 mm to 0.2 mm.

The metal foil layers 6 can be formed from planar metal sheets or from preformed metal sheets in a corresponding shape (see FIGS. 1 and 3), for example U- and/or Z-shaped. Of course, other shapes are possible. In order to keep production costs low, it can be expedient to use only planar metal sheets, with only the webs 3, 3' of the fiber composite components 1, 1' being provided with a hybrid laminate construction.

The CFRP layers 4, 5, 7 are produced from a CFRP composite material using, for example, epoxy resin or thermoplastic polymers or the like, the metal layers 6 being integrated into this laminate construction during production. The production can include wet-chemical processes.

Figure 6:
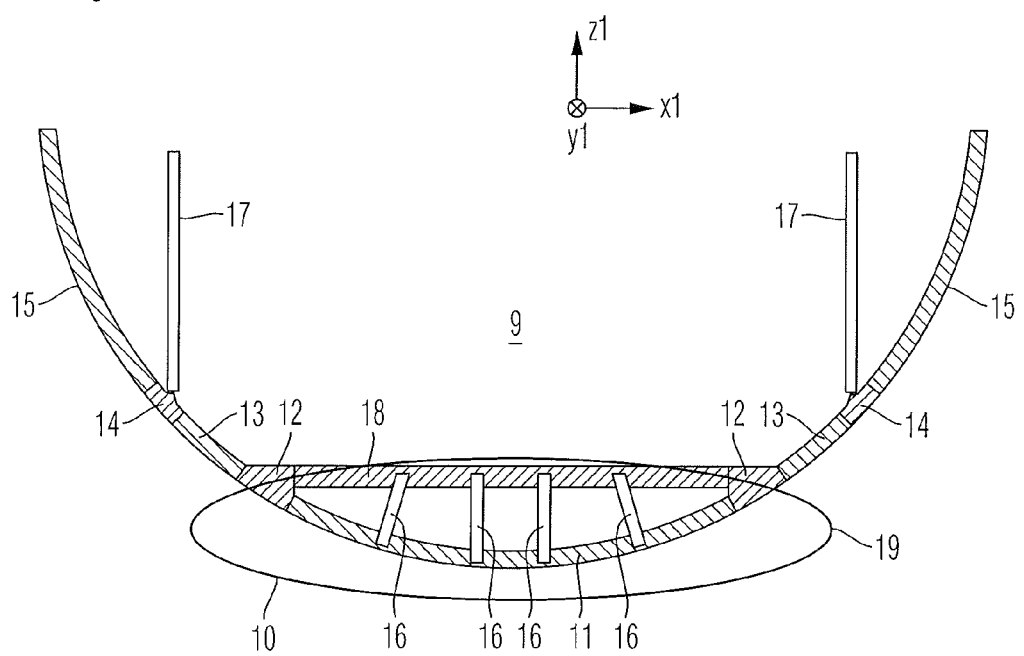
FIG. 6 is a schematic partial sectional view of an embodiment of a fuselage structure portion according to the invention of an aircraft or spacecraft.

FIG. 6 is a schematic partial sectional view of an embodiment of a fuselage structure portion according to the invention of an aircraft or spacecraft. A coordinate system x1, y1, z1 (different from the coordinate systems x, y, z associated with the respective fiber composite components 1, 1') comprises a width direction x1 of the aircraft or spacecraft (not shown), a longitudinal direction y1 and a height direction z1. A lower fuselage portion comprising a crash zone 19 is shown schematically and is intended to absorb as much impact energy as possible in the event of an impact, in order to protect a passenger cabin (not shown here) located above from overloading and safeguard the survival space therein.

In this case, the crash zone 19 comprises a floor former portion 11 which is substantially in the form of a segment of a circle and is connected at each the two ends thereof to a floor connection member 12 for a hold floor 18 of a hold 9. A large number of floor support members 16 are connected between the hold floor 18 and the floor former portion 11. The floor support members 16 are formed, for example, as U-shaped fiber composite components 1 according to FIGS. 1 and 2 and comprise the CFRP composite 8 according to FIG. 5 comprising metal foil layers 6 and CFRP layers 4, 5, 7. They are arranged with the longitudinal directions thereof (y-direction of the coordinates associated with the respective components) extending in the z1-direction in part and also radially. The floor former portion 11 and the floor connection members 12 are configured, for example, as Z-shaped formers also comprising, like the fiber composite component 1' according to FIGS. 3 and 4, the CFRP composite 8 according to FIG. 5 comprising metal foil layers 6 and CFRP layers 4, 5, 7. The longitudinal directions of these former members 11, 12 extend in the peripheral direction of the fuselage structure.

In this example, further fields of application of the fiber composite components 1, 1' according to the invention and the CFRP composite are provided. An example of this can be connector former portions 13 which are attached to the floor connection members 12 in each case and have the above-described construction according to FIGS. 3, 4 and 5. Support connection members 14 and, in the further progression, side former portions 15 are also attached hereto and can likewise be configured as fiber composite components 1, 1'. Support members 17 are also possible as fiber composite components 1 according to FIGS. 1, 2 and 5, the upper ends of which support a passenger cabin floor carrier and the lower ends of which are fastened to the respective support connection members 14. The longitudinal directions of the former members 13 to 15 extend in the peripheral direction of the fuselage structure, while in this example the longitudinal directions of the support members 17 extend in the z1-direction of the fuselage structure.

Although the present invention has been described here on the basis of preferred embodiments, it is not restricted thereto, but can be combined and modified in a multiplicity of different ways.

For example, the metal layers 6 can be pretreated at particular points so as to provide failure behaviour which can be determined in advance, for example buckling in a particular direction at a preferred point. Perforations, punchings, deformations, kinks and the like can be used for this purpose.

It is also conceivable for the metal foil layers 6 which are corrosion-resistant with respect to CFRP to be made of stainless steel or a similar material having a high ductility.

Of course, the CFRP composite 8 can be used to form fiber composite components 1, 1' other than those illustrated and described by way of example, having a different form and shape and a different field of application.

In the case of a fiber composite component for energy absorption in the event of a crash for an aircraft or spacecraft, the fiber composite component is formed as a laminate construction made of CFRP layers 4, 5, 7 and at least one integrated metal foil layer 6 which is corrosion-resistant with respect to the CFRP layers 4, 5, 7. A fuselage structure portion 10 of an aircraft or spacecraft is formed using at least one fiber composite component of this type. An aircraft or spacecraft comprises a fuselage structure portion of this type.

LIST OF REFERENCE NUMERALS 1, 1' fiber composite component
2, 2' side portion
3, 3' web
4 CFRP outer layer
5 CFRP cover layer
6 metal foil layer
7 CFRP inner layer
8 CFRP composite
9 hold
10 fuselage structure portion
11 floor former portion
12 floor connection portion
13 connector former portion
14 support connection member
15 side former portion
16 floor support member
17 support member
18 hold floor
19 crash zone
x, y, z; x1, y1, z1 coordinates

The invention claimed is:

1. A fiber composite component for impact energy absorption in a fuselage section of an aircraft or spacecraft;
wherein the fiber composite component extends in a three dimensional laminated form and the fiber composite component comprising:
a web portion having a width and extending in a longitudinal direction,
a plurality of side portions applied substantially at right angles to the web portion and extending in a longitudinal direction,
wherein the width of the web portion decreases in the longitudinal direction from one end to another end,
a plurality of CFRP layers, and
at least one integrated metal foil layer extending substantially in the same direction as a plurality of fibers of the fiber composite component,
wherein said at least one integrated metal foil layer is corrosion resistant with respect to the CFRP layers, having a ductility of at least 20%, and
wherein said at least one integrated metal foil layer is arranged between at least two CFRP layers, and is pretreated at a plurality of preferred points so as to provide a predetermined buckling in a direction at the plurality of preferred points absorb forces in the event of a crash of the aircraft or spacecraft through deformation work.

2. The fiber composite component according to claim 1, wherein the at least one metal foil layer is a sheet metal plate having a thickness of 0.15 to 0.3 mm.

3. The fiber composite component according to claim 1, wherein the at least one metal foil layer consists of a high-purity titanium material.

4. The fiber composite component according to claim 1, wherein the CFRP layers comprise a curable synthetic resin.

5. The fiber composite component according to claim 1, wherein the fiber composite component is formed as at least as one of a former, a former portion, a connector, a connection member, and a support member.

6. A fuselage structure portion of an aircraft or spacecraft, wherein the fuselage structure portion is formed as at least one of a crash, and an impact region comprising at least one fiber composite component according to claim 1.

7. An aircraft or spacecraft comprising a fuselage structure portion according to claim 6.

8. The fiber composite component according to claim 1, wherein the predetermined failure of said at least one integrated metal foil layer at the particular points is provided by perforations, punching, deformation, and kinks 9. The fiber composite component according to claim 1, wherein a form of said fiber composite component is one of a U form or a Z form.

* * * * *